No. 622,119. Patented Mar. 28, 1899.
M. J. CLARKE.
DEVICE FOR DROPPING OIL.
(Application filed Jan. 19, 1899.)
(No Model.)
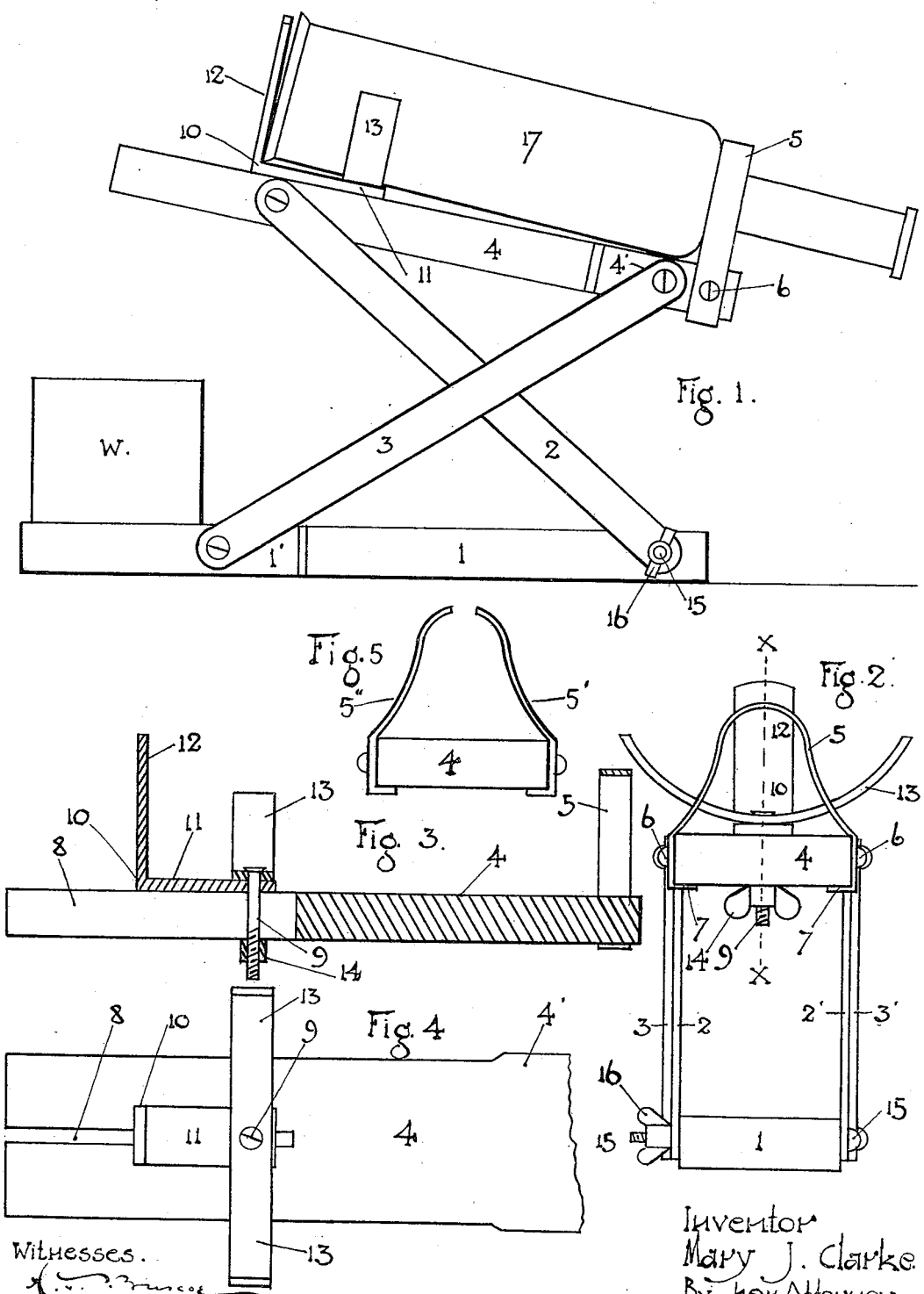
Witnesses.
Inventor
Mary J. Clarke.
By her Attorney

UNITED STATES PATENT OFFICE.

MARY J. CLARKE, OF HAVERHILL, MASSACHUSETTS.

DEVICE FOR DROPPING OIL.

SPECIFICATION forming part of Letters Patent No. 622,119, dated March 28, 1899.

Application filed January 19, 1899. Serial No. 702,615. (No model.)

*To all whom it may concern:*

Be it known that I, MARY J. CLARKE, a citizen of the United States, and a resident of Haverhill, in the county of Essex and State of Massachusetts, have invented certain new and useful Improvements in Devices for Dropping Oil, of which the following is a specification.

To secure the best results in making salad dressings and all mixtures which are of the nature of emulsions, the oil should be dropped into the bowl in which the emulsion is mixed drop by drop and at the same time the contents of the bowl should be stirred or beaten very rapidly. It is extremely difficult to hold the oil-bottle in one hand at such an inclination that the oil will run into the bowl drop by drop and at the same time to beat the contents of the bowl rapidly with the other. In fact, it is inconvenient to be unable to hold the bowl with one hand and beat with the other. Moreover, it is often desirable to beat the mixture with an egg-beater, which requires the use of both hands.

The object of my invention is to provide an adjustable bottle-holding support which may be readily adjusted to different inclinations and which will remain at any inclination at which it may be placed.

According to my invention I provide a base-piece, at each side of which is pivoted a pair of arms. Each pair of arms is crossed and both pairs are pivoted at their opposite ends to a bottle-holding support, which is provided with suitable means for retaining the bottle in position. By this means the bottle may be tipped to any desired inclination, and by providing a nut at one of the pivots just enough friction at the pivoted parts may be secured to cause the support to remain at any inclination at which it may be placed and yet be readily movable, the loosening of the nut being unnecessary.

For a more complete disclosure of my invention reference is made to the accompanying drawings, in which—

Figure 1 is a side elevation of my bottle-support, showing a bottle in position. Fig. 2 is a front elevation thereof with the upper portion horizontal. Fig. 3 is a cross-section on the line $x\ x$ of Fig. 2, the arms being omitted. Fig. 4 is a plan view of a portion of the bottle-holding part shown in Fig. 3, and Fig. 5 is a front view of a modification.

The base portion is made, preferably, of oblong form and may be a simple flat strip of wood, if desired. Arms 2 2' and 3 3' are pivoted at their lower ends to the sides of said base, the arms 2 2' being pivoted on opposite sides of the base near the front end thereof and the arms 3 3' being likewise pivoted near the rear end thereof.

4 is the bottle-holding support, which is made, preferably, of wood and is of similar size and shape as the base 1. The arms 2 2' are pivoted at their upper ends to the sides of support 4, near the rear end thereof, and the arms 3 3' are likewise pivoted to the front end thereof, so that the arms 2 and 3 and 2' and 3' cross each other. These arms may be wooden strips, if desired.

The rear end 1' of the base 1 and the front end 4' of the support 4 are enlarged sufficiently to prevent the arms 3 3' from binding on the arms 2 2'. It is desirable, however, that the inner sides of arms 3 3' come into contact with the outer sides 2 2', as shown, so that there will be some friction between them. This friction may be only what is necessary to prevent the support from being moved too readily, yet enough to hold the support at any inclination at which it may be placed. A bolt 15, which passes through the base and forms the pivot for arms 2 2', has a wing-nut 16 screwed thereon. By tightening this nut 16 an additional means for increasing the friction which must be overcome to change the inclination of the support 4 is provided.

The forward end of support 4 is provided with a yoke 5, which is of such size and shape as to permit the passage thereinunder of the neck of an ordinary bottle, but which is sufficiently small to forbid the passage of the body portion of a bottle of ordinary size. This yoke is secured to the sides of support 4 by screws 6 and extends underneath support 4, as shown at 7, to prevent rotation thereof on the screws 6. If desired, this yoke may be secured in place by the same screws as those used to secure the arms 3 3' to the bottle-support.

The support 4 is split centrally by a slot 8, which extends from the rear end thereof for a portion of its length, said slot being of sufficient width to permit the bolt 9 to slide readily therein. A bracket 10, right-angular in form, rests with a horizontal portion 11 on the top and longitudinally of the support 4, the other portion 12 extending perpendicularly therefrom. A curved U-shaped strip 13 rests on the horizontal portion 11 of the angular strip 10, said curved strip 13 being arranged to extend crosswise the support 4. The bracket 10 and the curved strip 13 are secured together and onto the support 4 by means of bolt 9 and nut 14. A bottle 17 is shown in position on the support in Fig. 1.

The manner of using my device is as follows: The front end of the support 4 is lifted, causing the opposite end to be lowered. The neck of the bottle is then inserted through the yoke until the body portion of the bottle bears against the yoke, as shown. The nut 14 is then loosened, so that the bracket 10 may be moved up against the bottom of the bottle, holding the bottle against the yoke and preventing longitudinal movement thereof. The body of the bottle will then lie in the curved piece 13, which will prevent the bottle from rolling from the support. When the bracket 10 and curved piece 13 are moved to the proper position and the nut 14 tightened, these parts will not be moved again unless it is wished to use a different-sized bottle in the support. After the bottle is placed in position on the support the forward end thereof is lowered until the oil begins to drip, and if during the mixing operation it is necessary to change the inclination of the support it may be readily done by moving it to the desired position without going to the trouble of loosening or tightening any nuts, the friction of the parts being sufficient to hold the support at any inclination at which it may be placed.

If it is desired to place the device so that the neck of the bottle will overhang the edge of a table or shelf to some extent, a weight W may be placed on the rear end of the base 1, which is extended backward to some extent for this purpose.

It will be seen from the foregoing that this device is very effective for the purpose for which it is intended and, moreover, may be very cheaply constructed. The base 1, support 4, and connecting-arms may be made of wood, while the yoke, curved support, and bracket may be readily made from strips of tin bent in proper form.

It is obvious that this support may be adjusted to hold a bottle of almost any size or shape in which olive-oil is likely to be put up. A bottle from which oil may be dropped satisfactorily should have a somewhat longer neck than bottles of common form, and olive-oil is usually put up in such bottles.

Slight modifications of the above-described device may be made without departing from the spirit of the invention. For example, it may be found desirable to make the yoke 5 in two parts 5 5', as shown in Fig. 5. Under certain conditions this construction might be found especially desirable, as in case the neck of the bottle is very large the two parts of the yoke will spring apart, permitting the insertion of the bottle.

Having described my invention, what I claim as new, and desire to secure by Letters Patent, is as follows:

1. A device for dropping oil consisting of a base portion, a bottle-supporting portion, a pivotal connection between said base and said support, said support being provided with a yoke at its forward end which is adapted to receive the neck of the bottle, an angular bracket which is adapted to be secured to the rear portion of said support and to slide longitudinally thereof so as to engage the bottom of the bottle and hold the neck thereof in said yoke as described.

2. A device for dropping oil consisting of a base portion, a bottle-supporting portion, a pivotal connection between said base and said support, said support being provided with a yoke at its forward end which is adapted to receive the neck of the bottle, an angular bracket which is adapted to be secured to the rear portion of said support and to slide longitudinally thereof and engage the bottom of the bottle to hold the neck thereof in said yoke, arms extending upwardly on each side of said support between said bracket and said yoke and adapted to hold the bottle against lateral movement as described.

3. A device for dropping oil consisting of a base portion, a bottle-supporting portion, a pivotal connection between said base and said support, said support being provided with a yoke at its forward end which is adapted to receive the neck of the bottle, an angular bracket which is adapted to be secured to the rear portion of said support and to slide longitudinally thereof and engage the bottom of the bottle to hold the neck thereof in said yoke, a U-shaped strip secured at its base to said support between said bracket and said yoke, and having its ends extending upwardly on each side of the bottle as described.

4. A device for dropping oil, consisting of a base, a bottle-supporting portion, a pair of arms pivoted to the front of said base and the rear of said support, a second pair of arms pivoted to the rear of said base and the front of said support each pair of crossed arms being arranged to frictionally engage each other at their middle portion, a yoke secured to the forward end of said bottle-supporting portion and a longitudinally-adjustable bracket secured to the rear portion thereof whereby different-sized bottles may be held in place on said support and then tilted to different inclinations substantially as described.

5. An adjustable bottle-support consisting of a base portion, a bottle-supporting portion pivotally connected thereto, said supporting portion being provided at its forward end with means for engaging the neck of the bottle and holding the same against lateral movement, a longitudinal slot in the rear portion of said support, a bracket having a base portion resting on said support and an upwardly-projecting portion adapted to engage the bottom of the bottle, a U-shaped strip arranged crosswise of the support and resting on the base portion of said bracket, a bolt passing through said bracket, U-shaped piece, and slot, and a nut for clamping said parts to said support, whereby said bracket and U-shaped piece may be adjusted to the size of the bottle.

6. A device for dropping oil consisting of a base portion, a bottle-supporting portion, a pivotal connection between said base and said support, means located on the front end of said support for engaging the neck of the bottle and holding the same against forward and lateral movement, a bracket adjustably secured to the rear portion of said support having an upwardly-projecting portion which is adapted to engage the bottom of the bottle, and a U-shaped strip located in front of said bracket and adjustably secured to said support.

In testimony whereof I have affixed my signature in presence of two witnesses.

MARY J. CLARKE.

Witnesses:
LOUIS H. HARRIMAN,
WM. L. BAKER.